(No Model.)
J. B. WALLACE.
HORSESHOE.
No. 601,028. Patented Mar. 22, 1898.
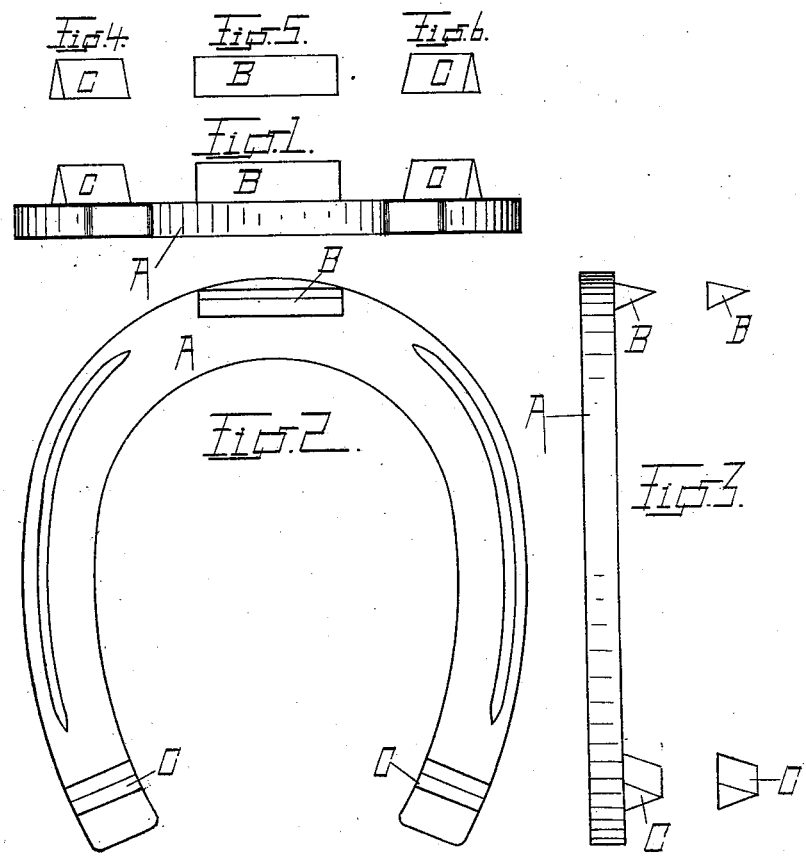
WITNESSES:
INVENTOR
Jacob B. Wallace
BY
ATTORNEY.

UNITED STATES PATENT OFFICE.

JACOB BENNETT WALLACE, OF ERIE, PENNSYLVANIA.

HORSESHOE.

SPECIFICATION forming part of Letters Patent No. 601,028, dated March 22, 1898.

Application filed November 24, 1897. Serial No. 659,677. (No model.)

*To all whom it may concern:*

Be it known that I, JACOB BENNETT WALLACE, a citizen of the United States, residing at Erie, in the county of Erie and State of Pennsylvania, have invented certain new and useful Improvements in Horseshoes; and I do hereby declare the following to be a full, clear, and exact description of the invention, such as will enable others skilled in the art to which it appertains to make and use the same.

This invention relates to horseshoes; and it consists in certain improvements in the construction thereof, as will be hereinafter fully described, and pointed out in the claims.

Heretofore horseshoes have been sold to horseshoers in the form of flat metal plates, and the shoer has formed calks on these plates by turning down the ends for the rear calks and by welding on the front calk. This construction has certain limitations, among which may be stated the difficulty in using for the calks a different metal from that of the plates, restrictions as to the metals possible or practical to use for calks, the difficulty in replacing the calks, and restrictions as to the location of the calk on the shoe. I propose to remedy these defects by attaching the calks to the plates by brazing, and as an additional feature to form the calks of some metal the temper or wearing qualities of which is not interfered with by the heating incident to the brazing.

The invention is illustrated in the accompanying drawings, as follows:

Figure 1 shows an end elevation of the shoe. Fig. 2 shows a plan view. Fig. 3 shows a side elevation. Figs. 4, 5, and 6 show the calks detached.

A marks the hoof-plate, B the front calk, and C the rear calk.

I prefer using what is known as "self-hardening" steel as the material for the calks, as it is not readily abraded and from its inherent quality remains hard after the heating due to brazing. Other material not affected as to quality by the heat of brazing may be used advantageously.

The calks may be placed in any position on the shoe. Thus the plate may be extended back to the rear calk to support the heel of the horse, and the point of the calk may be placed away from the edge of the plate, if desired. To change the calks or renew them, it is only necessary to heat the shoe sufficiently to melt the brazing material. The calks will then drop off or can be easily removed. This feature is particularly desirable when the horse is used on icy pavements, as the non-abrading quality of the harder metal thus made practical wears longer and when the calks become smooth they can be readily replaced.

The plates may be of some easily-worked material. The range of metals which can be joined by brazing is much greater than those which can be united by welding, so that the most desirable material for both the plates and calks can be used. Numerous attempts, involving the expenditure of large sums of money, have been made to effect this result, as by casting, by making special drop-forgings, using peculiar methods of tempering, &c.; but, so far as I am able to ascertain, nothing has been devised which is so effectual as is my device.

While the claims as set forth do not describe the brazing of the calks to the shoe-plate as a separate and distinct inventive feature, I do not wish to be understood as disclaiming it or excluding it from being considered as a separate and distinct inventive feature in support of the invention set forth in the claims.

What I claim as new is—

1. As an article of manufacture, a horseshoe comprising a metal hoof-plate and a calk or calks, secured to said plate by brazing said calk or calks, being formed of material the non-abrading quality of which does not deteriorate by reason of the heating incident to brazing.

2. As an article of manufacture, a horseshoe comprising a metal hoof-plate and a calk or calks, secured to said plate by brazing, said calk or calks being formed of material differing in quality or character from the material of the plate and being of such quality or character as not to be injured relatively to its use as a calk by the heat incident to the brazing.

3. As an article of manufacture, a horseshoe comprising a metal hoof-plate, and a calk or calks secured to said plate by brazing, said calk or calks being formed of a material differing in quality or character from the material of the plate, the non-abrading quality of which material forming the calk or calks does not deteriorate by reason of the heating incident to brazing.

In testimony whereof I affix my signature in presence of two witnesses.

JACOB BENNETT WALLACE.

Witnesses:
 H. C. LORD,
 JAS. P. HALLEN.